US007792337B2

(12) United States Patent
Higuchi (10) Patent No.: US 7,792,337 B2
(45) Date of Patent: Sep. 7, 2010

(54) IMAGING APPARATUS AND METHOD FOR AUTHENTICATION OF USER

(75) Inventor: Teruyuki Higuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/412,864

(22) Filed: Mar. 27, 2009

(65) Prior Publication Data

US 2009/0252387 A1    Oct. 8, 2009

(30) Foreign Application Priority Data

Apr. 8, 2008    (JP) .............................. 2008-100872

(51) Int. Cl.
*G06K 9/00* (2006.01)
(52) U.S. Cl. ..................................... 382/126
(58) Field of Classification Search ........................ None
See application file for complete search history.

(56) References Cited

U.S. PATENT DOCUMENTS 6,404,904 B1 *  6/2002  Einighammer et al. ...... 382/124
7,580,552 B2 *  8/2009  Yoshizu et al. ............... 382/115
2008/0192989 A1 *  8/2008  Asano et al. ................. 382/115
2009/0304237 A1 * 12/2009  Yoshikawa et al. .......... 382/116

FOREIGN PATENT DOCUMENTS

| JP | 1995021373 A | 1/1995 |
| JP | 2003085538 A | 3/2003 |
| JP | 2006107401 A | 4/2006 |

* cited by examiner

*Primary Examiner*—Brian P Werner (57) ABSTRACT

The imaging apparatus for authenticating a user can quickly perform matching step of the inputted biometric data. This apparatus for authenticating the user includes an imaging unit for imaging a guided finger and a guided palm, a matching data storing unit for storing the determined finger image and the determined palm image, and a matching unit for matching the imaged finger image and the imaged palm image with the stored finger image and the stored palm image. The matching unit selects the finger image having the similar feature amount based on the imaged finger image and authenticates a user based on the result of matching of the palm image corresponding to the selected finger image with the imaged palm image.

16 Claims, 6 Drawing Sheets

FIG. 6

IMAGING APPARATUS AND METHOD FOR AUTHENTICATION OF USER

This application is based upon and claims priority from Japanese Patent Application No. 2008-100872 filed Apr. 8, 2008, which is incorporated herein in its entirety.

BACKGROUND OF THE INVENTION

The present invention relates to an imaging apparatus for authenticating a user based on biometric data obtained by imaging.

In the biometric data authentication technology for authenticating an individual by utilizing imaged data of fingers, a system has already been proposed, in which a pattern of the skin, for example, a fingerprint or the like or a blood vessel pattern is matched with the previously stored data. Moreover, even in the biometric data authentication technology for authenticating a user by utilizing a palm, a system is also known, in which a pattern of the skin such as a palm pattern or a blood vessel pattern of a palm is matched with the previously stored data. For example, a user is authenticated for an automated teller machine (ATM) installed at a bank by utilizing biometric data of a finger or a palm as explained above.

Meanwhile, in the market of the automated teller machine (ATM), each bank installs nowadays the imaging apparatus for authenticating a user having loaded only one or both of the finger and palm biometric data authentication technologies. ATM is required to be ready for use at many banks and has to provide a biometric data imaging (inputting) device for both fingerprint and palm pattern. As a result, it makes ATM more expensive and it cause ATM not to be in widespread use.

With the background as explained above, the Japanese unexamined patent application publication No. 2003-85538 which has already been filed as a related art of the present invention discloses a method utilizing a fingerprint as the biometric data as the related art of a non-contact type biometric data imaging apparatus.

Moreover, the Japanese unexamined patent application publication No. H7(1995)-21373 discloses a method utilizing blood vessels of a finger as biometric data.

Further, the Japanese unexamined patent application publication No. 2006-107401 discloses a method utilizing blood vessels of a palm as biometric data.

However, the imaging apparatuses for authentication of a user disclosed in the above patent documents respectively utilize different optical systems and imaging units. Therefore, the imaging apparatus for authentication of a user has to utilize plural input units and imaging units for embodying, for example, the plurality of biometric data authentication technologies for fingerprint and palm pattern. Accordingly, the imaging apparatus for authentication of a user has a problem that it is difficult to attain reduction in size and price.

In addition, when a user authenticating apparatus utilizes single biometric data, a result of an authentication depends on physical conditions, skin conditions, and blood pressure of a user at the time of imaging, it cause a problem that the apparatus cannot obtain a stable authentication accuracy.

Furthermore, selection of at least one image data matched with the imaged data from a large amount of data requires matching steps for each image of the image data stored previously. Therefore, in this case, a problem that a longer period is also required for the matching step is still left unsolved.

SUMMARY OF THE INVENTION

An object of the present invention is to provide an imaging apparatus for authenticating a user, which can quickly perform matching steps of biometric data.

According to one aspect of the present invention, an imaging apparatus for authenticating a user is provided which includes a finger guide unit for guiding an imaging area of a finger, a palm guide unit for guiding an imaging area of a palm, an imaging unit for imaging biometric data of imaging areas of the guided finger and palm, an image storing unit for storing at least one finger image and at least one palm image, and a matching unit for matching the imaged finger data and the imaged palm data with the stored finger image and the stored palm image, in which the matching unit further includes a selecting unit for selecting stored finger image having the similar feature amount(numerical value) based on the imaged finger data and an authentication unit for authenticating the user based on the matching result of matching the stored palm image corresponding to the selected finger image with the imaged palm data.

According to one aspect of the present invention, an imaging method for authenticating a user is provided which includes a finger imaging step for imaging an imaging area of the finger guided with the finger guide unit, a finger image matching step for matching the imaged data of the finger obtained by the imaging step with the stored finger image data, a palm imaging step for imaging an imaging area of the palm guided by the palm guide unit, a palm image matching step for matching the imaged data of the palm obtained by the imaging step with the stored palm image data, and a matching step for matching the user based on the matching result of the finger image data and the palm image data.

According to one aspect of the present invention, a computer readable medium recording thereon a program for enabling computer to execute a finger imaging function for imaging an imaging area of the finger guided by the finger guide unit, a finger image matching function for matching the imaged finger data obtained by the imaging function with the stored finger data, a palm imaging function for imaging the imaging area of the palm guided by the palm guide unit, a palm image matching function for matching the imaged palm data obtained by the imaging function with the stored palm image data, and an authenticating function for authenticating the user based on the matching result of matching the finger image data and the palm image data.

According to one aspect of the present invention, an imaging apparatus for authenticating a user is provided which includes an imaging unit for imaging biometric data of an imaging area of a palm and a finger of the user, an image storing unit for storing at least one finger image and at least one palm image from the same user, and a matching unit for matching said imaged finger data and said imaged palm data with said stored finger image data and said stored palm image data, wherein said matching unit includes a selecting unit for selecting a finger image from said storing unit based on a comparison of a numerical value associated with said imaged finger data and a numerical value associated with said stored finger image, an authentication unit for authenticating the user based on the result of matching said imaged palm data with the stored palm image data corresponding to said selected finger image.

BRIEF DESCRIPTION OF THE DRAWINGS

Other features and advantages of the invention will be made more apparent by the following detailed description and the accompanying drawings, wherein:

FIGS. 2A and 2B are internal structural views of FIG. 1, wherein FIG. 2A is a vertical cross-sectional view which includes an imaging means, while FIG. 2B is a cross-sectional view along the line A-A of FIG. 2A.

In the drawings, the same reference numerals represent the same structural elements.

DETAILED DESCRIPTION OF THE PREFERRED EMBODIMENTS

A first embodiment of the present invention will be described in detail below.

Figure 1:
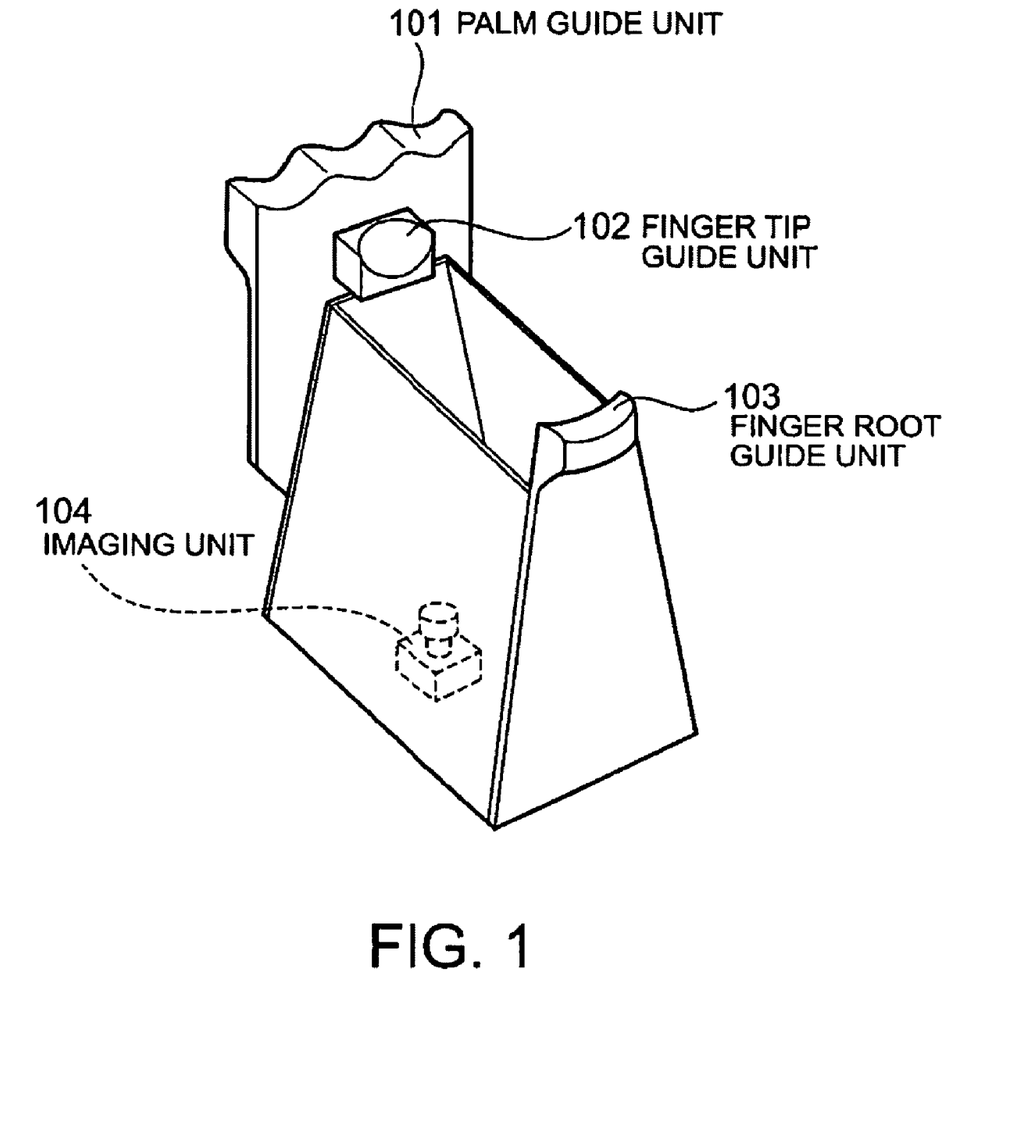
FIG. 1 is a schematic structural perspective view showing an imaging apparatus for authenticating a user as an exemplary embodiment of the present invention.

Basic structural elements in the first embodiment of the present invention will be explained first. Imaging apparatus for imaging biometric data of the exemplary embodiment (hereinafter referred to as an "imaging apparatus") 100 is provided, as shown in FIG. 1, with imaging unit 104, for example, a camera or the like provided within the internal side of imaging apparatus 100. Moreover, imaging apparatus 100 includes finger tip guide unit 102 and finger root guide unit 103. These finger tip guide unit 102 and finger root guide unit 103 guide, for imaging unit 104, imaging areas of fingerprint and finger blood vessel pattern of a finger to the position suitable for the imaging step. Moreover, imaging apparatus 100 also includes palm guide unit 101. This palm guide unit 101 guides a palm pattern and a blood vessel pattern of the palm to the position suitable for the imaging step. Finger tip guide unit 102, finger root guide unit 103, and palm guide unit 101 are provided at the upper part of imaging apparatus 100.

On the occasion of imaging a finger with imaging apparatus 100, a tip of the finger of a user is placed on finger tip guide unit 102 and a root of the relevant finger (a finger root) is also placed simultaneously on finger root guide unit 103. Accordingly, the finger of a user is guided to the position suitable for the imaging step by imaging unit 104.

Moreover, a finger root of the hand of the user is placed on palm guide unit 101. Thereby, a palm of the user is guided to the position suitable for the imaging step by imaging unit 104.

Here, position of the imaging area of a palm guided by palm guide unit 101 is set in the side becoming further from imaging unit 104 than the position of imaging area of the finger guided by finger tip guide unit 102 and finger root guide unit 103. In the imaging direction of imaging unit 104, for example, palm guide unit 101 is located at the position further than the positions of finger tip guide unit 102 and finger root guide unit 103. As a result, the guided finger is located at the position between the position of the guided palm and imaging unit 104.

Therefore, since the distance up to imaging unit 104 of imaging area of the guided palm becomes longer than that of imaging area of the guided finger, the palm can be imaged in the area wider than the imaging area of finger. Accordingly, accuracy of the biometric authentication based on the palm image data can be improved.

Moreover, finger tip guide unit 102, finger root guide unit 103, and palm guide unit 101 are arranged to set the positions of imaging areas of the guided finger and palm to be overlapped in the vertical direction. An occupied area of imaging apparatus 100 can therefore be set small. As a result, cost and space required for installation of the imaging apparatus can be reduced.

Figure 4:
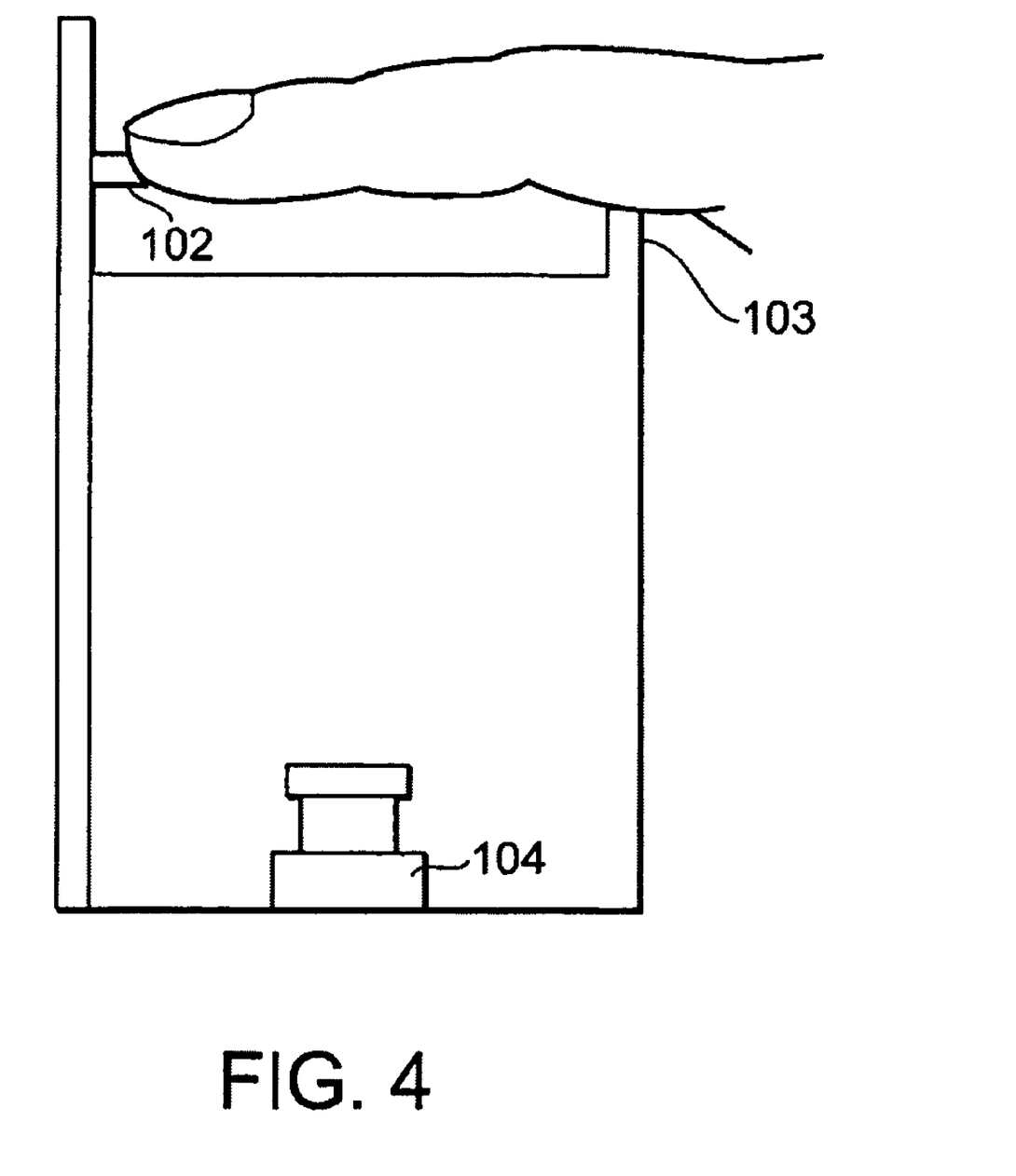
FIG. 4 is a side view of a finger imaging step in the imaging apparatus for authenticating a user as an embodiment of the present invention.

Palm guide unit 101 includes concave areas 201, 202, and 203. When imaging unit 104 images a palm pattern and blood vessels of a palm, the root portions of the three central fingers (first finger, second finger, and third finger) of a palm of user are respectively placed on these concave areas as shown in FIG. 4. As a result, the imaging areas of the palm are guided and thereby the imaging unit 104 can image the imaging areas of the palm.

Figure 5:
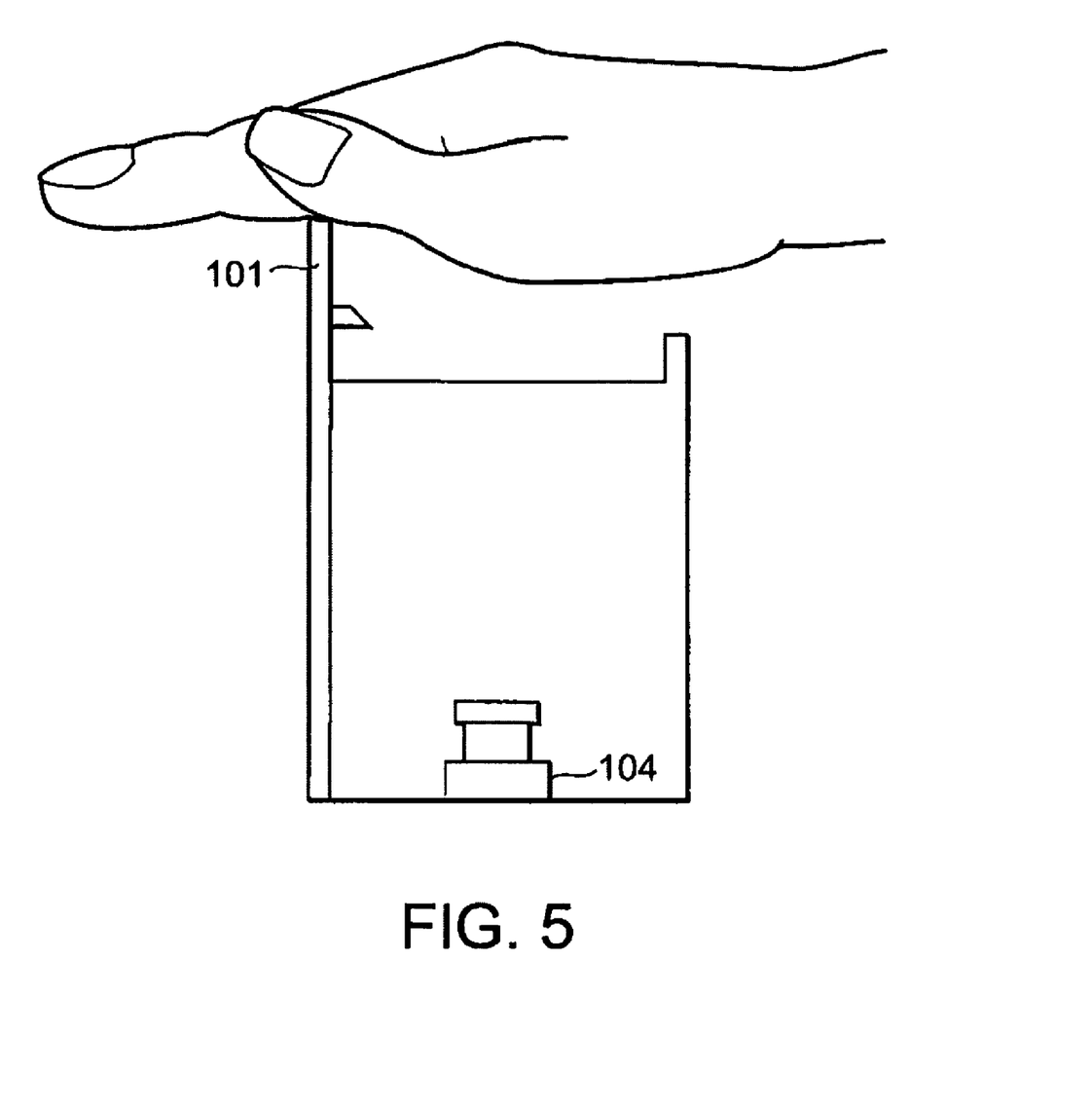
FIG. 5 is a side view of a palm imaging step in the imaging apparatus for authenticating a user as an exemplary embodiment of the present invention.

Finger tip guide 102 and finger root guide unit 103 guide the finger. When imaging unit 104 images a fingerprint and a blood vessel pattern of the finger of user, the finger tip is placed on the finger tip guide unit 102 and the root of finger is placed on the finger root guide unit 103 as shown in FIG. 5. As a result, the imaging area of the finger is guided and imaging unit 104 can obtain data of the imaging area of finger.

Figures 2A, 2B:
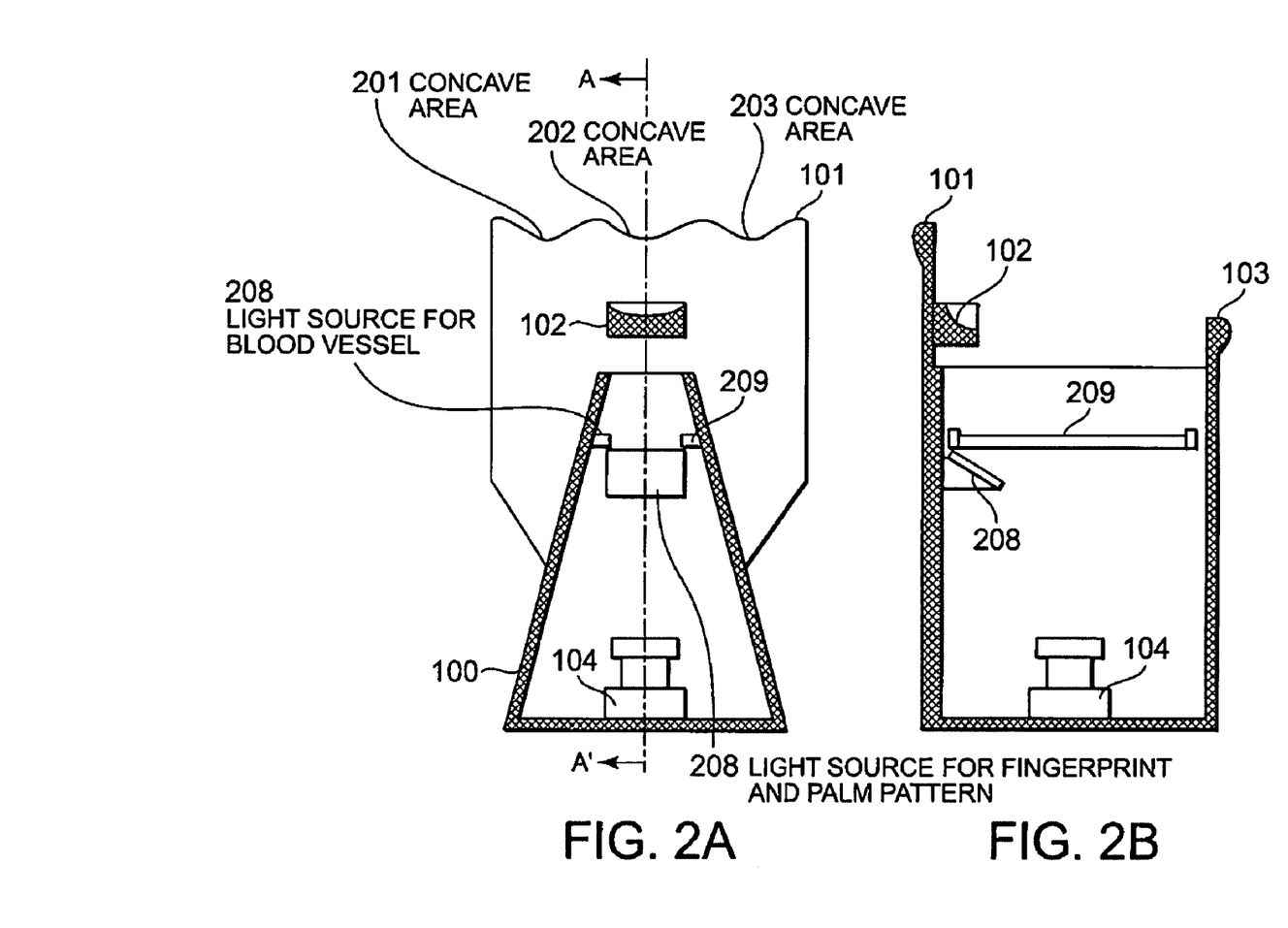

Here, a vertical cross-sectional view including imaging unit 104 of imaging apparatus 100 is shown in FIG. 2A and a cross-sectional view along the line A-A in FIG. 2A is shown in FIG. 2B.

Here, light source for fingerprint and palm pattern 208 is formed in the shape of a plane and is arranged at a single surface in the side of finger tip (in the front surface side) of the apparatus as shown in FIG. 2A and FIG. 2B. Light source for fingerprint and palm pattern 208 is lit for imaging a fingerprint or a palm pattern by radiating the fingerprint part of finger or palm pattern of palm. Light source for fingerprint and palm pattern 208 preferably radiates the light from only one direction, because it is desirable that shadows are formed as much as possible by concave and convex areas on the surface of skin in view of imaging a fingerprint and a palm pattern that is formed through concave and convex areas on the surface of skin.

Light source for fingerprint and palm pattern 208 is desirable to be formed as the light source of a shorter wavelength having difficulty in imaging of blood vessel. Moreover, when considering removing effect of disturbing lights, light source for fingerprint and palm pattern 208 can provide a longer wavelength of near infrared light that can also be provided by light source for blood vessel 209. In the case where both light source for fingerprint and palm pattern 208 and light source for blood vessel 209 provide the similar lights of longer wavelength, sufficient contrast can be obtained through arrangement in which the exclusive light source for fingerprint and palm pattern radiates the light only in one direction. In addition, influence of external light impeding identification of fingerprint and palm pattern can be suppressed sufficiently by processing the imaged data.

Light source for blood vessel 209 is formed as a linear light source and is respectively arranged at the internal sides of both right and left sides of the imaging apparatus. Light source for blood vessel 209 radiates the near infrared light to the guided finger and palm in order to image the blood vessels of finger and palm.

In addition, for imaging of blood vessel patterns of a finger and a palm, light source for blood vessel 209 radiates the lights from the two directions in both sides of the finger and the palm as the imaging objects in order to prevent as much as possible appearance of shadows of a fingerprint and a palm pattern formed by the concave and convex areas on the surface of skin on the data obtained by the imaging step.

Imaging unit 104 has a function to generated respective image data by imaging a fingerprint and a blood vessel pattern of a finger or a palm pattern and a blood vessel pattern of a palm.

Here, imaging unit 104 is constituted, for example, with an image sensor such as CCD and CMOS, a control system, and a lens optic system for focusing an image of finger and palm on the image sensor. Moreover, imaging unit 104 also includes an AD converter or the like for converting an image focused on the image sensor by the imaging step into image data.

Furthermore, imaging unit 104 is provided with several imaging modes. For example, imaging unit 104 has a finger imaging mode in which adequate focus distance and shutter speed, etc. for imaging fingers are preset and a palm imaging mode in which adequate focus distance and shutter speed etc, for imaging palms are preset.

Figure 3:
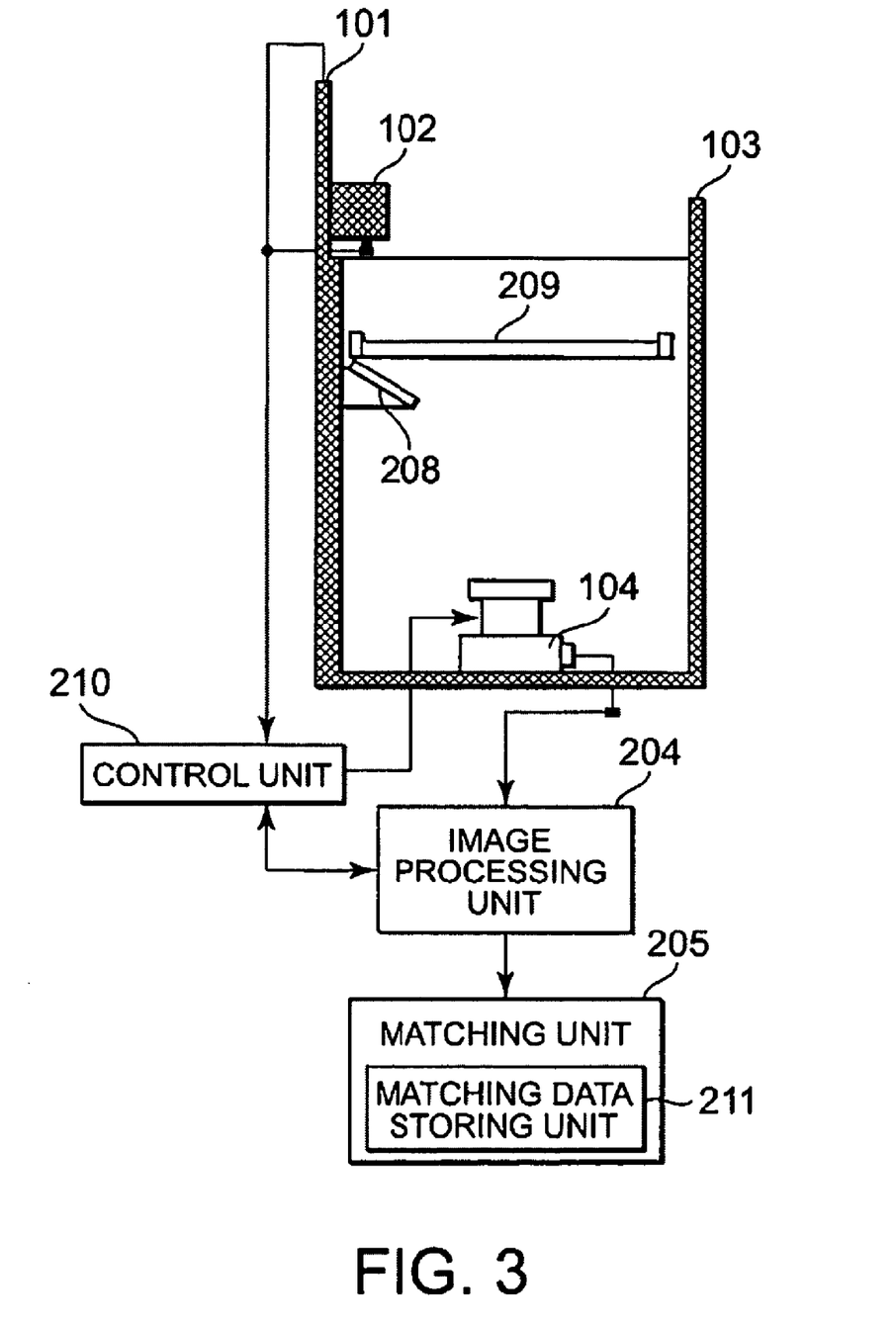
FIG. 3 is a schematic block diagram showing an internal structure of the imaging apparatus for authenticating a user as an exemplary embodiment of the present invention.

In addition, imaging apparatus 100 is connected to imaging unit 104 as shown in FIG. 3. Imaging apparatus 100 includes image processing unit 204 for selecting image data generated by relevant imaging unit 104, matching unit 205 for storing image feature amount (data) such as a blood vessel pattern, and control unit 210 connected to imaging unit 104 to control imaging modes, etc. of relevant imaging unit 104.

Image processing unit 204 selects a fingerprint, a palm pattern, and image feature amount of a finger and a palm from the image data obtained by imaging unit 104. Image processing unit 204 has an image feature amount selecting function for sending the selected feature amount data to matching unit 205.

Here, image processing unit 204 is constituted with a microcomputer or the like. Image processing unit 204 processes image data of a fingerprint of a finger and a palm pattern and blood vessel image of a palm.

Matching unit 205 has an image data matching function for matching image feature amount data sent from image processing unit 204 on the basis of the image feature amount data stored previously.

Control unit 210 is connected, as shown in FIG. 3, to imaging unit 104 to provide an imaging mode control function for controlling the imaging modes of imaging unit 104.

Here, control unit 210 may also be provided with a gradation mode setting function for setting the imaging mode of imaging unit 104 on the basis of the image data transferred from image processing unit 204. In this case, control unit 210 obtains image data obtained by the imaging step and checks gradation of the preset one or the plurality of different pixels in this image data. Accordingly, the focused image can be determined as the finger image or palm image.

For example, control unit 210 acquires gradation of several pixels at the part deviated to any of the right or left side of the imaged data based on the imaged data. Control unit 210 can determine, when gradation shows "black" completely, that the image acquired shows a focused image of finger only at the center of image.

Moreover, control unit 210 can determine, when the preset pixels show "white" gradation completely, that the entire part of screen of the image data shows the focused image. Therefore, this image can be determined as the image of palm having a wider focusing area.

The imaging object can be determined as the image of finger or palm as explained above, and the imaging mode of imaging unit 104 can also be set to the imaging mode suitable for the imaging object.

Further, control unit 213 is connected to palm guide unit 101 and finger tip guide unit 102 to provide, for example, a guide detecting function to detect the palm on palm guide unit 101 through a sensor when the finger root, for example, is placed on palm guide unit 101, namely when palm guide unit 101 guides the palm. Accordingly, when it has been detected that a hand is placed on the palm guide unit, the imaging object can be determined as the palm and the imaging mode of imaging unit 104 can be set to the imaging mode suitable for the imaging object (palm).

For example, when the finger tip is placed on finger guide unit 102, in other words, when finger guide unit 102 guides the finger, control unit 210 detects the finger placed on the finger guide unit with the guide detecting function and determines that the imaging object is the finger. Here, the imaging mode of imaging unit 104 can be set (changed) to the imaging mode suitable for the imaging object (palm).

Accordingly, imaging apparatus 100 can image a fingerprint, a palm pattern, a finger blood vessel pattern, and a palm blood vessel pattern and thereby can effectively assure security of authentication of an individual.

In addition, a small-sized and low price biometric data imaging apparatus can be provided by imaging and authenticating a fingerprint and blood vessels of the finger and a palm pattern and blood vessels of the palm with only one imaging unit. Meanwhile, influence on authentication generated by appearance of specific characteristic or feature of image data that is different in every imaging unit used for the imaging step can be controlled by imaging plural different biometric data with the same imaging unit 104.

Moreover, control unit 210 also has a fingerprint position forecasting and detecting function for detecting (forecasting), by controlling imaging unit 104, position of the fingerprint as the relative position of the imaged finger blood vessel pattern image. Therefore, imaging areas of the fingerprint and palm pattern as the relative positions can be forecasted and identified on the basis of the imaged finger blood vessel pattern image and palm blood vessel pattern image.

Matching unit 205 has an image matching function for matching stored images such as stored fingerprint, palm pattern, and blood vessel pattern, etc. with the imaged data.

Matching unit 205 also has a function for selecting (selecting) a stored finger blood vessel image (blood vessel image of an authentication candidate of finger) matched with the stored feature amount by matching the stored finger blood vessel image in matching data storing unit 211 with the transferred finger blood vessel feature image.

Matching unit 205 selects feature amount in the transferred feature image data. Moreover, matching unit 205 additionally has a function for conducting 1:N matching with the stored images (N), based on this feature amount. Furthermore, matching unit 205 selects, as the feature amount, a candidate image similar to the feature amount by selecting the stored image matched in plural feature amounts. In other words, matching unit 205 has a candidate image selecting function for conducting rough matching of feature amount in accordance with the preset matching level. Therefore, matching unit 205 can quickly select an authentication candidate image from many stored images.

When the image sent to matching unit 205 is a palm image (palm blood vessel pattern, palm pattern image) obtained by imaging a pattern, the image data of palm is subjected to the matching step during a longer period, because this image data is larger in the image size than the image data of finger. Therefore, matching unit 205 can specifically determine the stored palm image as the object of matching step by matching fingerprint or blood vessel of finger or both of the fingers with the stored data. Accordingly, the time required for palm matching step can be reduced.

In addition, it is possible here to variably set the level of matching of matching unit 205. For example, feature amount is set using fine setting points (many setting points). Therefore, the number of stored images specified (selected) by the matching step can be limited.

Next, operations of biometric data imaging apparatus for authenticating a user 100 will then be explained below.

First of all, imaging unit 104 images a finger and a palm guided. Matching unit 205 matches the imaged finger image data with the stored finger image data to select the stored finger image having the similar feature amount (finger image matching and selecting step). Next, matching unit 205 matches the stored palm image corresponding to the selected stored finger image with the imaged palm data (palm matching step).

Meanwhile, processing steps may be conducted as explained below. Namely, imaging unit 104 images an imaging area of the guided finger (imaging step) and the imaged data of finger obtained this imaging step is roughly matched with the stored finger image data (coarse matching step of finger image). Here, the imaging mode set by imaging unit 104 is changed to the palm imaging mode for imaging a palm (imaging mode changing step). Next, imaging unit 104 images an imaging area of the palm guided by palm guide unit 101 (palm imaging step). Thereafter, matching unit 205 authenticates a user (palm authenticating step) by matching the stored palm image corresponding to respective selected and stored finger image with the imaged palm data (palm image matching step).

The finger image matching and selecting step, palm matching step, finger imaging step, coarse finger image matching step, imaging mode changing step, palm imaging step, and palm authenticating step may respectively be constituted suitable for execution by a computer through introduction of programs of such execution contents. In this exemplary embodiment, the imaged finger blood vessel pattern image, fingerprint image, palm blood vessel pattern image, and palm pattern image are matched and determined in this sequence for authenticating a user. However, it is also allowable to conduct matching and authenticating of a user through a combination of finger blood vessel pattern image, palm blood vessel pattern image, and palm pattern image and a combination of fingerprint image, palm blood vessel pattern image, and palm pattern image. On the other hand, it is moreover possible that matching and authenticating steps are conducted by utilizing a combination of finger blood vessel pattern image, palm blood vessel pattern image, and palm pattern image and a combination of fingerprint image, palm blood vessel pattern image, and palm pattern image. In addition, matching and authenticating steps may also be done by utilizing a combination of finger blood vessel pattern image, fingerprint image, and palm blood vessel pattern image and a combination of finger blood vessel pattern image, fingerprint image, and palm pattern image.

Accordingly, coarse matching with the stored image can be conducted quickly on the basis of the finger image of the small imaging area (finger blood vessel pattern image, fingerprint image). In addition, matching step can also be executed on the basis of the palm image (palm blood vessel pattern, palm pattern image). As a result, reduction in the total time required for authenticating a user can be realized.

Figure 6:
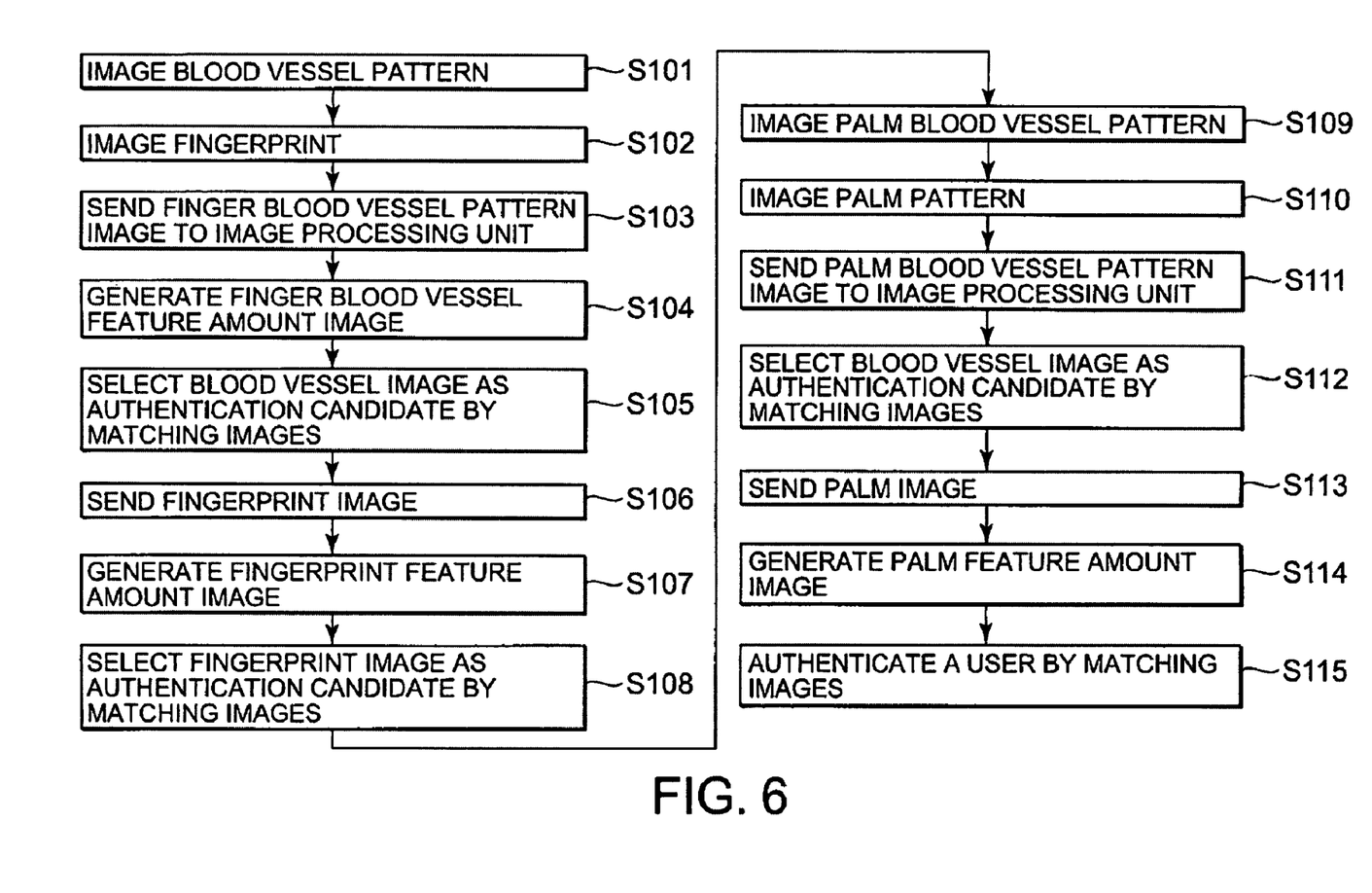
FIG. 6 is a flowchart showing the entire operation processing steps in the imaging apparatus for authenticating a user as an exemplary embodiment of the present invention.

Operations of the imaging apparatus 100 as the exemplary embodiment explained above will be explained in detail based on the flowchart of FIG. 6. First, imaging unit 104 images a finger blood vessel pattern of the guided finger (step S101: finger blood vessel imaging step). In this case, the finger of a user is placed, as shown in FIG. 5, on finger tip guide unit 102 and finger root guide unit 103. Thereby, the finger placed on finger tip guide unit 102 and finger root guide unit 103 is guided to the position just suitable for imaging step.

Moreover, it is also possible for control unit 210 to detect that the finger is placed on finger tip guide unit 102 and finger root guide unit 103. When control unit 210 detects the finger placed on both guide units, the imaging mode of imaging unit 104 is set to the finger imaging mode and imaging unit 104 can image a finger blood vessel pattern of the guided finger. Further, it is also allowable here that control unit 210 is capable controlling the imaging mode of imaging unit 104 to the finger imaging mode or to the palm imaging mode, on the basis of gradation of the particular pixels within the image obtained by the imaging step of imaging unit 104.

In this case, control unit 210 determines, based on gradation of the particular pixels in the imaged data, whether the finger or palm is placed correctly on the guides for the imaging step. For example, when the pixels set at the area near both right and left ends of the imaged data have gradation higher than the preset gradation, namely such pixels are colored more in black (thick black) than the other pixels, the finger is determined to be placed correctly on the guide units. Meanwhile, when such pixels have gradation lower than the preset gradation, namely such pixels are colored less in black (thin black), the palm is determined to be placed.

Next, imaging unit 104 images a fingerprint of the guided finger (step S102: fingerprint imaging step). Here, it is allowable for control unit 210 to detect (forecast) position of the fingerprint as the relative position of the imaged finger blood vessel pattern data by controlling the imaging unit 104 prior to the fingerprint imaging step. Since scope of search of the fingerprint as the imaging object is limited by the step explained above, search time of fingerprint position and time required for imaging of fingerprint can be reduced effectively. Moreover, the center area of fingerprint can be searched and set effectively based on the relative position of the imaged finger blood vessel pattern data. As a result, quality of imaged fingerprint data can be more improved.

Next, imaging unit 104 sends the imaged finger blood vessel pattern data to image processing unit 204 (step S103). Thereafter, image processing unit 204 selects a feature amount of image on the basis of this finger blood vessel pattern image to generate the finger blood vessel feature amount data. In addition, image processing unit 204 sends this finger blood vessel feature amount image data to matching unit 205 (step S104: finger blood vessel feature amount image generating step).

Next, matching unit 205 matches the stored finger blood vessel storing image in the matching data storing unit 211 with the finger blood vessel feature amount image transferred. Matching unit 205 also selects (selects) the stored finger blood vessel image (authentication candidate finger blood vessel image) matched with the stored feature amount (step S105: authentication candidate finger blood vessel image selecting step). Here, matching unit 205 also selects feature amount of the finger blood vessel feature amount image (1) transferred and conducts 1:N matching with the stored finger blood vessel images (N) based on the selected feature amount. For example, matching unit 205 selects, as the feature amount, the finger blood vessel storing image matched in the fine feature amounts. As explained above, matching unit 205 selects the candidate image similar in the feature amount from the stored image data. In other words, matching unit 205 executes the coarse feature amount matching step. Accordingly, matching unit 205 can quickly select the authentication candidate image from many stored images.

Here, it is also allowable that matching level of matching unit 205 can be set variably. For example, the number of stored (selected) images to be identified by the matching step can be limited through fine setting of (many) feature amounts.

Next, imaging unit 104 transmits the imaged fingerprint data to image processing unit 204 (step S106). Image processing unit 204 selects feature amount based on this fingerprint image, generates a fingerprint feature amount image, and transmits this fingerprint feature amount image to matching unit 205 (step S107: fingerprint feature amount image generating step). The processing steps 106 to 107 explained above may be set to be executed following the step S103. Accordingly, image processing unit 204 can transmit the feature amount of the imaged fingerprint to matching unit 205 during the finger blood vessel candidate image selecting step of the step S105. As a result, total matching time can be shortened.

Next, matching unit 205 matches the fingerprint feature amount image transferred with stored fingerprint images respectively corresponding to the selected finger blood vessel storing images (step S108: authentication candidate fingerprint image selecting step).

In the case where a user having previously stored the own biometric data is identified as a result of the authentication candidate finger blood vessel image selecting step in the step S105, matching unit 205 mutually matches the identified stored fingerprint image with the fingerprint feature amount data. Owing to such 1:1 matching (1:1 blood vessel matching), authentication of a user can be conducted.

Here, matching unit 205 matches respective fingerprint images corresponding to each selected stored finger blood vessel image with the fingerprint data based on the feature amount points (for example, five points) included in the imaged fingerprint image (fingerprint matching step). Moreover, matching unit 205 selects the authentication candidate fingerprint image having the feature amount point data matched with or approximated to the feature amount point data mentioned above. Therefore, matching unit 205 further selects the restricted area of the authentication candidate image from the selected authentication candidate fingerprint image based on the position of feature amount point data.

Here, matching level of the matching step conducted by matching unit 205 can be variably set. For example, a large number of feature amount point data of the fingerprint data are set. Thereby, the number of authentication candidate images narrowly selected by the relevant matching step is then limited to a small number.

Successively, imaging unit 104 images a palm blood vessel pattern (step S109: palm blood vessel imaging step). As an example, the palm of user is placed on the palm guide unit as shown in FIG. 6.

Here, control unit 210 detects that the finger root part is placed on the palm guide unit 101. Control unit 210 can set the imaging mode of imaging unit 104 to the finger imaging mode. Imaging unit 104 can image the blood vessel pattern of the guided palm.

Meanwhile, control unit 210 can set the imaging mode of imaging unit 104 to the palm imaging mode on the basis of gradation of the particular pixels in the image data obtained by imaging unit 104.

In this case, control unit 210 determines whether the finger is placed or the palm is placed on the guides based on gradation of the particular pixels in the imaged data. For example, when the pixels set in the area near both right and left end portions at the center of image obtained by the imaging step have gradation higher than the present gradation of the same pixels, in other words, when the pixels are colored more in black (thick black), the finger is determined to be placed on the guide units. Moreover, when the relevant pixels have gradation lower than the present gradation of the same pixels, namely when the pixels are colored less in black (thin black), the palm is determined to be placed on the guide units. Thereafter, imaging unit 104 images a palm pattern of the guided hand (step S110: fingerprint imaging step).

Next, imaging unit 104 transmits the imaged palm blood vessel pattern image to image processing unit 24 (step S111).

Here, image processing unit 204 selects feature amount of image based on this palm blood vessel pattern image and generates a palm blood vessel feature amount image. Moreover, image processing unit 204 transmits this palm blood vessel feature amount image to matching unit 205 (step S111: palm blood vessel feature amount image generating step).

Next, matching unit 205 matches the stored palm blood vessel images respectively corresponding to the authentication candidate fingerprint images selected from the palm blood vessel images stored in matching data storing unit 211 with the fingerprint feature amount image transferred (step S112: palm blood vessel matching step).

Here, matching unit 205 conducts matching of palm blood vessel patterns based on the feature amounts included in the imaged palm blood vessel pattern images among the palm blood vessel images corresponding to the selected authentication candidate fingerprint images, in view of selecting the authentication candidate palm blood vessel image matched in the feature amount. Accordingly, matching unit 205 is additionally capable of executing restrictive selection of the authentication candidate image based on the feature amount of palm blood vessel pattern from the selected authentication candidate images.

Here, matching unit 205 can variably set its matching level. For example, many feature amounts of the palm blood vessel pattern data can be set (matching level is raised). Thereby, the number of authentication candidate images narrowly selected by the relevant matching can be limited to a small number.

In the case where a user whose biometric data are stored is identified as a result of the authentication candidate finger blood vessel image selecting step in the step S105 or the authentication candidate fingerprint image selecting step in the step S108, matching unit 205 mutually matches the identified stored fingerprint image with the fingerprint feature amount image. Moreover, matching unit 205 can authenticate and determine a user through the 1:1 matching (1:1 palm blood vessel matching).

Next, imaging unit 104 transmits the imaged palm pattern image to image processing unit 204 (step S113).

Here, image processing unit 204 generates a palm pattern feature amount image by selecting feature amount of the image based on this palm pattern image. Furthermore, image processing unit 204 sends this palm pattern feature amount image to matching unit 205 (step S114: palm pattern feature amount image generating step) Next, matching unit 205 executes matching between the palm pattern feature amount image inputted and the stored palm pattern images respectively corresponding to the selected authentication candidate palm blood vessel images mentioned above (step S115: Palm pattern matching step).

Here, matching unit 205 further executes the matching based on the feature amount data included in the palm pattern feature amount image among the stored palm pattern images corresponding to the selected authentication candidate blood pattern images explained above. In addition, matching unit 205 identifies only one stored palm pattern image matched in its feature amount data.

Here, when matching unit 205 has identified only one palm pattern data, authentication of a user can be completed successfully. Moreover, when the biometric data image of only one user has been identified as a result of the palm blood vessel matching step in the step S112, matching unit 205 is capable of matching, with the 1:1 matching step, the stored palm pattern image corresponding to the blood vessel image of authentication candidate narrowly selected to only one user with the palm pattern feature amount image on the basis of the feature amount point data included in both images (palm pattern matching step).

Here, the palm pattern data is matched as a result of 1:1 matching step, authentication of a user is completed successfully. Meanwhile, if the palm pattern data is never matched, it means fail of authentication.

As explained above, in the exemplary embodiment of the present invention, the biometric data imaging apparatus authenticates a user through matching of palm images by imaging biometric data of a finger and a palm and by executing coarse matching with the stored finger image based on the imaged finger image. As a result, total processes for matching and authentication of a user can be executed quickly. Moreover, a user can be authenticated using only the data of imaged finger and palm images without input of ID by the user. As a result, high security can be ensured for the authentication processes.

In addition, in the exemplary embodiment of the present invention, the biometric data imaging apparatus conducts authentication of a user by combining biometric data of a finger and a palm. Accordingly, it is possible to acquire the authentication accuracy higher than that of the authentication system in the related art utilizing single biometric data.

In the exemplary embodiment explained above, the setting is made so that the imaged finger blood vessel pattern image, fingerprint image, palm blood vessel pattern image, and palm pattern image are subjected to the matching step in this sequence for authentication of a user. However, it is also possible to achieve the setting for authentication of a user by respectively combining the finger blood vessel pattern image or fingerprint image and the palm blood vessel pattern image or palm pattern image.

As explained above, a user can be authenticated using the imaged data of a finger and a palm without input of ID by the user. As a result, higher security for authentication can be secured. Moreover, user authentication processes having the authentication accuracy higher than that of the authenticating system of the related art utilizing single biometric data can be realized.

Furthermore, in the exemplary embodiment of the present invention, single imaging unit 104 is capable of imaging the biometric data of the finger and the palm. Therefore, the present invention can provide the imaging apparatus lower in price and smaller in size than the apparatus combining plural imaging units.

Common and single imaging unit 104 images the biometric data of fingerprint and blood vessel pattern of the finger and palm pattern and blood vessel pattern of the palm. Accordingly, images can be obtained on the basis of image quality under the common optical conditions.

The present invention can be applied to an authentication apparatus for authenticating a user based on biometric data of a finger and a palm prior to use of ATM and a personal computer or the like and to an individual authentication system that is utilized when a person enters or leaves a room or building.

While this invention has been described in conjunction with the preferred embodiments described above, it will now be possible for those skilled in the art to put this invention into practice in various other manners.

What is claimed is:

1. An imaging apparatus for authenticating a user comprising:
   a palm guide unit for guiding an imaging area of a palm;
   a finger guide unit for guiding an imaging area of a finger;
   an imaging unit for imaging biometric data of said imaging area of the palm and the finger of the user;
   an image storing unit for storing at least one finger image and at least one palm image; and
   a matching unit for matching said imaged finger and said imaged palm data with said stored finger image and said stored palm image,
   wherein said matching unit includes:
   a selecting unit for selecting a finger image from said storing unit based on feature amount of said imaged finger data and that of said stored finger image;
   an authentication unit for authenticating the user based on the result of matching the stored palm image corresponding to said selected finger image with said imaged palm data.

2. The apparatus according to claim 1,
   wherein said imaging unit further has:
   a finger imaging function for imaging a fingerprint and a finger blood vessel pattern; and
   a palm imaging function for imaging a palm pattern and a palm blood vessel pattern,
   wherein said authentication unit further includes a switching unit for switching an imaging mode back and forth between a finger imaging mode and a palm imaging mode.

3. The apparatus according to claim 2,
   wherein said matching unit further includes:
   a biometric data storing part for storing at least one image of finger blood vessel pattern and at least one image of palm blood vessel pattern, said both images being linked;
   a matching part for matching said imaged finger blood vessel with said stored image of blood vessel pattern;
   a selecting part for selecting a finger blood vessel pattern from said biometric data storing part, a feature amount of said selected finger blood vessel pattern corresponding to that of said imaged finger blood vessel pattern,
   wherein said matching part matches a palm blood vessel pattern corresponding to said each of selected images of finger blood vessel pattern with said imaged palm blood vessel pattern, and
   wherein said matching part further has a palm authenticating function for authenticating the user based on the result of said matching.

4. The apparatus according to claim 2,
   wherein said matching unit further includes:

a biometric data storing part for storing at least one image of finger blood vessel pattern and at least one image of palm pattern, said both images being linked;
a matching part for matching said imaged finger blood vessel with said stored image of blood vessel pattern; and
a selecting part for selecting a finger blood vessel pattern from said biometric data storing part, a feature amount of said selected finger blood vessel pattern corresponding to that of said imaged finger blood vessel pattern,
wherein said matching part matches a palm pattern corresponding to said each of selected images of finger blood vessel pattern with said imaged palm pattern, and
wherein said matching part further has a palm authenticating function for authenticating the user based on the result of said matching.

5. The apparatus according to claim 2,
wherein said matching unit further includes:
a biometric data storing part for storing at least one image of fingerprint and at least one image of palm blood vessel pattern, said both images being linked;
a matching part for matching said imaged fingerprint with said stored image of fingerprint; and
a selecting part for selecting an image of fingerprint from said biometric data storing part, a feature amount of said selected image corresponding to that of said imaged fingerprint,
wherein said matching part matches a palm blood vessel pattern corresponding to said each of selected images of fingerprint with said imaged palm blood vessel pattern, and
wherein said matching part further has a palm authenticating function for authenticating the user based on the result of said matching.

6. The apparatus according to claim 2,
wherein said matching unit further includes:
a biometric data storing part for storing at least one image of fingerprint and at least one image of palm pattern, said both images being linked;
a matching part for matching said imaged fingerprint with said stored image of fingerprint; and
a selecting part for selecting an image of fingerprint from said biometric data storing part, a feature amount of said selected image corresponding to that of said imaged fingerprint,
wherein said matching part matches a palm blood vessel pattern corresponding to said each of selected images of fingerprint with said imaged palm blood vessel pattern, and
wherein said matching part further has a palm authenticating function for authenticating the user based on the result of said matching.

7. The apparatus according to claim 2,
wherein said matching unit further includes:
a biometric data storing part for storing at least one image of fingerprint, at least one image of finger blood vessel pattern, and at least one image of palm vessel pattern, said three kinds of images being linked;
a matching part for matching said imaged fingerprint with said stored image of fingerprint based on said image of finger blood vessel pattern and said image of fingerprint; and
a selecting part for selecting an image of fingerprint and an image of finger blood vessel pattern from said biometric data storing part, a feature amount of said selected image corresponding to that of said imaged fingerprint and said imaged finger blood vessel pattern,
wherein said matching part matches a palm blood vessel pattern corresponding to said each of selected image of fingerprint and image of finger blood vessel pattern with said imaged palm blood vessel pattern, and
wherein said matching part further has a palm authenticating function for authenticating the user based on the result of said matching.

8. The apparatus according to claim 7, further comprising:
a setting unit for setting a position of imaging area for said fingerprint based on said image of finger blood vessel pattern.

9. The apparatus according to claim 2,
wherein said matching unit further includes:
a biometric data storing part for storing at least one image of fingerprint, at least one image of finger blood vessel pattern, and at least one image of palm pattern, said three kinds of images being linked;
a matching part for matching said imaged fingerprint with said stored image of fingerprint based on said image of finger blood vessel pattern and said image of fingerprint; and
a selecting part for selecting an image of fingerprint and an image of finger blood vessel pattern from said biometric data storing part, a feature amount of said selected image corresponding to that of said imaged fingerprint and said imaged finger blood vessel pattern,
wherein said matching part matches a palm pattern corresponding to said each of selected image of fingerprint and image of finger blood vessel pattern with said imaged palm pattern, and
wherein said matching part further has a palm authenticating function for authenticating the user based on the result of said matching.

10. The apparatus according to claim 2,
wherein said matching unit further includes:
a biometric data storing part for storing at least one image of finger blood vessel pattern, at least one image of palm blood vessel pattern, and at least one image of palm pattern, said three kinds of images being linked; and
a matching part for matching said imaged finger blood vessel pattern with said stored image of finger blood vessel pattern, said matching unit further having a selecting part for selecting an image of finger blood vessel pattern from said biometric data storing part, a feature amount of said selected image corresponding to that of said imaged blood vessel pattern,
wherein said matching part matches a palm blood vessel pattern and a palm pattern corresponding to said each of selected image of finger blood vessel pattern with said imaged palm blood vessel pattern and said imaged palm pattern, and
wherein said matching part further has a palm authenticating function for authenticating the user based on the result of said matching.

11. The apparatus according to claim 10, further comprising:
a setting unit for setting a position of imaging area for said palm pattern based on said image of palm blood vessel pattern.

12. The apparatus according to claim 2,
wherein said matching unit further includes:
a biometric data storing part for storing at least one image of fingerprint, at least one image of palm blood vessel pattern, and at least one image of palm pattern, said three kinds of images being linked;
a matching part for matching said imaged fingerprint with said stored image of fingerprint; and a selecting part for selecting an image of fingerprint from said biometric data storing part, a feature amount of said selected image corresponding to that of said imaged fingerprint, wherein said matching part matches a palm blood vessel pattern and a palm pattern corresponding to said each of selected image of fingerprint with said imaged palm blood vessel pattern and said imaged palm pattern, and wherein said matching part further has a palm authenticating function for authenticating the user based on the result of said matching.

13. The apparatus according to claim 2, wherein said matching unit further includes:

a biometric data storing part for storing at least one image of fingerprint, at least one image of finger blood vessel pattern, at least one image of palm blood pattern, and at least one image of palm pattern, said four kinds of images being linked;

a matching part for matching said imaged fingerprint and said imaged finger blood vessel pattern with said stored image of fingerprint and stored image of finger blood vessel pattern; and a selecting part for selecting an image of fingerprint and an image of finger blood vessel pattern from said biometric data storing part, a feature amount of said selected image corresponding to that of said imaged fingerprint and said imaged finger blood vessel pattern, wherein said matching part matches a palm blood vessel pattern and a palm pattern corresponding to said each of selected image of fingerprint and image of finger blood vessel pattern with said imaged palm blood vessel pattern and said imaged palm pattern, and wherein said matching part further has a palm authenticating function for authenticating the user based on the result of said matching.

14. A method for authenticating a user comprising:

(a) imaging a biometric data of a finger and a palm of the user, guided by a palm guide unit and a finger guide unit;

(b) matching said imaged finger data with a stored finger data stored in storing unit;

(c) selecting a finger image from said storing unit based on feature amount of said imaged finger data and that of said stored finger data;

(d) matching a palm image corresponding said selected finger image from said storing unit with said imaged palm data; and (e) authenticating the user based on the result of said matching.

15. A non-transitory computer readable medium embodying a program, said program causing an apparatus to perform a method for authenticating a user, said method comprising:

(a) imaging a biometric data of a finger and a palm of the user, guided by a palm guide unit and a finger guide unit;

(b) matching said imaged finger data with a stored finger data stored in storing unit;

(c) selecting a finger image from said storing unit based on feature amount of said imaged finger data and that of said stored finger data;

(d) matching a palm image corresponding to said selected finger image from said storing unit with said imaged palm data; and (e) authenticating the user based on the result of said matching.

16. An imaging apparatus for authenticating a user comprising:

an imaging unit for imaging biometric data of an imaging area of a palm and a finger of the user;

an image storing unit for storing at least one finger image and at least one palm image from the same user; and a matching unit for matching said imaged finger data and said imaged palm data with said stored finger image data and said stored palm image data, wherein said matching unit includes:

a selecting unit for selecting a finger image from said storing unit based on a comparison of a numerical value associated with said imaged finger data and a numerical value associated with said stored finger image;

an authentication unit for authenticating the user based on the result of matching said imaged palm data with the stored palm image data corresponding to said selected finger image.

* * * * *